United States Patent [19]

Lawes

[11] 4,399,630
[45] Aug. 23, 1983

[54] FISH DETECTING FISHING ROD AND HOLDER

[76] Inventor: Elmer E. Lawes, Box 244, Moline, Mich. 49335

[21] Appl. No.: 233,978

[22] Filed: Feb. 12, 1981

[51] Int. Cl.³ .............................................. A01K 97/12
[52] U.S. Cl. ......................................... 43/17; 43/21.2
[58] Field of Search ...................... 43/16, 17, 21.2, 23, 43/25

[56] References Cited

U.S. PATENT DOCUMENTS

| | | | |
|---|---|---|---|
| 2,280,457 | 4/1942 | Sutcliffe | 43/17 |
| 2,464,309 | 3/1949 | Harshman | 43/17 |
| 2,634,538 | 4/1953 | Sader et al. | 43/17 |
| 2,927,995 | 3/1960 | Francis | 43/23 |
| 3,470,647 | 10/1969 | Horner | 43/17 |
| 3,624,689 | 11/1971 | Rizzo | 43/17 |
| 3,628,275 | 12/1971 | Howard | 43/17 |
| 3,903,633 | 9/1975 | Hutcherson | 43/17 |
| 4,051,616 | 10/1979 | Mathauser | 43/17 |
| 4,154,015 | 5/1979 | Holland | 43/17 |

FOREIGN PATENT DOCUMENTS 637843  5/1950  United Kingdom ................... 43/17

Primary Examiner—Nicholas P. Godici
Assistant Examiner—Marc Hodak
Attorney, Agent, or Firm—Waters, Lesniak & Willey

[57] ABSTRACT

A fish detecting fishing rod which includes a mercury switch mounted near the tip of the rod. A handle is provided on the lower end of the rod which has an electrical plug receiver at the base thereof. A holder sized to receive and hold the rod handle has an electrical plug to plug into the handle plug receiver. An electrical alarm and alarm power source are electrically connected to the holder plug, and the mercury switch and the handle plug receiver are electrically interconnected. When the rod tip is bent upwardly or downwardly, the mercury switch actuates the alarm to signal a fish strike.

4 Claims, 4 Drawing Figures

FISH DETECTING FISHING ROD AND HOLDER

BACKGROUND OF THE INVENTION

1. Field of the Invention

The present invention relates to fishing rods and, more particularly, to a fish detecting fishing rod.

2. Description of the Prior Art

As is well known to the experienced fisherman, there are times where the fishing rod is left unattended or when a multiple of fishing rods are being used at one time. As also is known to the experienced fisherman, should a fish strike without a rather quick response by the fisherman, too often such unattended strikes will result in a lost fish. While a variety of devices have been tried to signal the fisherman when there has been a strike, most of these have been either unreliable, complicated or simply ineffective. Accordingly, the world of fishing enthusiasts would welcome a simple, yet effective and reliable fish detecting fishing rod.

SUMMARY OF THE INVENTION

According to the present invention, there is provided a fish detecting fishing rod which not only gives warning of a fish strike, but which also gives warning of tangled lines or lures, and which is even sensitive enough to detect a small fish on a lure not large enough to break the release on a downrigger. The unique fishing rod is simple in construction and easy to operate.

The novel fish detecting fishing rod comprises a fishing rod with a mercury switch mounted near the tip thereof. A handle on the lower end of the rod has electrical plug receiving means, preferably a pair of female sockets, at the base thereof. A rod holder, which is sized to receive and hold the rod handle, has electrical plug means, preferably a pair of male plug prongs, which plug into the handle plug sockets.

An electrical alarm, such as a buzzer or a bell and a power source for the alarm are provided with electrical connecting means, such as wires, connecting the power source, the alarm and the holder plug means. Electrical connecting means, such as wires, are also provided to electrically connect the mercury switch with the handle plug receiving means. Preferably, electrical wires are run from the mercury switch internally of the rod and the handle to the handle plug receiving means. Also preferably, a manual on-off switch is provided for the alarm to render the alarm inoperative when setting up the fishing rod.

In an embodiment used for fishing from land, the alarm and power source are contained within the rod holder, and spike means are provided at the base of the holder for anchoring the holder to the ground.

DESCRIPTION OF THE PREFERRED EMBODIMENTS

Figure 1:
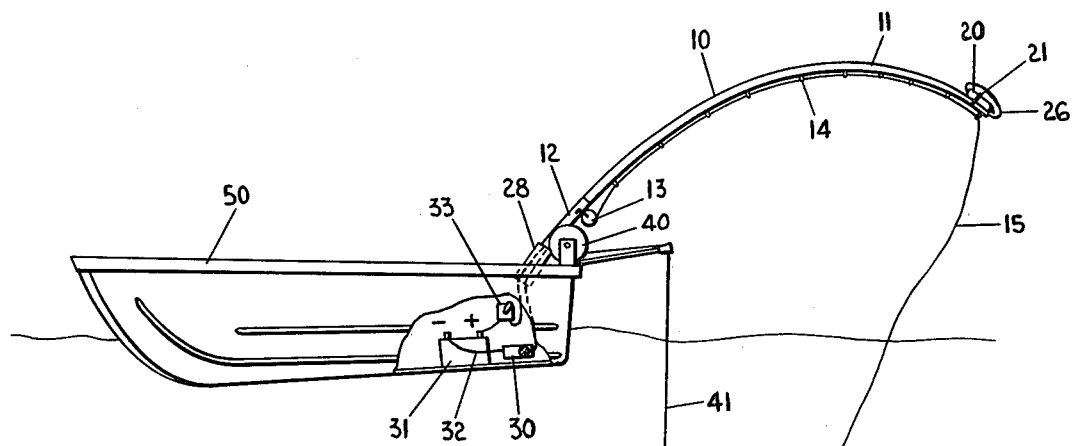
FIG. 1 is a side-elevational view of the fish detecting fishing rod of the present invention mounted on a boat.
Figure 2:
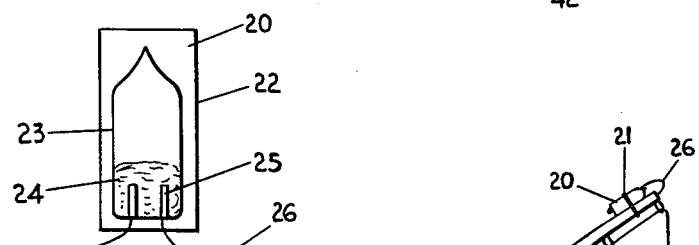
FIG. 2 is a side cross-sectional view of the mercury switch.

Referring to the drawings in greater detail, FIG. 1 shows the fish detecting fishing rod 10 mounted on the stern of boat 50. Fishing rod 10 includes rod 11 and handle 12, with conventional reel 13 and line eyelet guides 14. At the tip of rod 11, mercury switch 20 is mounted by any conventional mounting means, such as band 21. Mercury switch 20 can be any of the commercially available mercury switches which operate in response to a change in orientation. For example, in FIG. 2, a typical mercury switch 20 is shown which includes protective casing 22, mercury vile 23 and the liquid mercury 24. Electrodes 25 are provided in vile 23 which are connected to wires 26 leading out of casing 22. If casing 22 is rotated or tipped, the mercury will flow toward the top of the vile, thereby breaking the electrical connection between electrodes 25.

Figure 3:
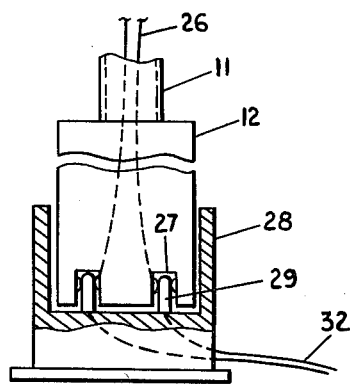
FIG. 3 is a side cross-sectional view of the rod handle in place in the rod holder.

Preferably, rod 11 is hollow and wires 26 lead from mercury switch 20 internally of rod 11 and handle 12 and are connected to female sockets 27, as shown in FIG. 3.

The fishing rod is seated in rod holder 28, which is mounted on boat 50, by inserting handle 12 into holder 28 so that male plugs 29 plug into female sockets 27, as shown in FIG. 3.

A conventional alarm 30, such as a buzzer or a bell, is provided, together with a power source 31, such as the boat's battery. Alarm 30, power source 31 and male electrical prongs 29 are electrically interconnected by means of wires 32. Preferably, one of wires 32 passes through an electrical switch 33 to render the alarm inoperative while loading and setting the fishing rod.

The operation of the fish detecting fishing rod can be best described with respect to the embodiment shown in FIG. 1. As shown, fishing rod 10, which is mounted in rod holder 28 on the stern of boat 50, is being used in conjunction with downrigger 40 having downrigger line 41 and downrigger weight 42. Near the end of fishing line 15 with lure 16 at the end thereof, a downrigger line clip 43 holds line 15 to downrigger weight 42. With the downrigger line and fishing line in place in the water and with the rod seated in the rod holder, electrical switch 33 is closed. With mercury switch in the generally vertical position as shown, the mercury will be in the upper half of vile 24. In this position, alarm 30 will not be activated. If a fish strikes lure 16, line 15 will be pulled from clip 43 permitting the tip of rod 11 to rise, thus causing mercury switch 20 to pass through horizontal position. In this position, the mercury will flow to make contact between electrodes 25 to to actuate alarm 30 to signal a fish strike.

Although line 15 will be released from clip 43 preferably always by fish strikes, the same sequence of triggering the alarm will occur if a snag, weeds or other obstruction causes line 15 to pull from clip 43. In addition, because of the sensitivity of the mercury switch, even a minor pulling on lure 16, such as by a small fish, will cause enough upward and downward movement of line 15 and therefore of the tip of rod 11 to cause the mercury to make contact between electrodes 25 to signal a disturbance. In either case, the fisherman is quickly alerted to attend to his fishing rod. As soon as the fisherman removes the fishing rod from rod holder 28 to attend to either the fish strike, the snag or the like, sockets 27 and prongs 29 are disengaged to automatically shut the alarm.

Thus, the unique fish detecting fishing rod requires no complicated connections for each use, since it automatically electrically connects and disconnects upon inserting and removing the fishing rod from the rod holder.

Figure 4:
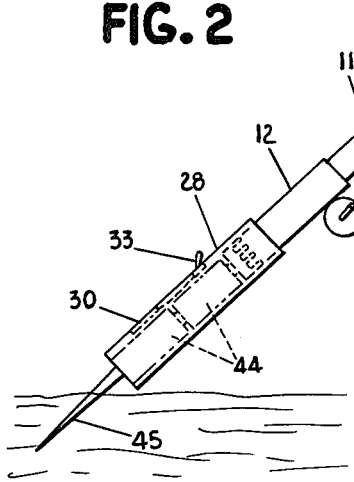
FIG. 4 is a perspective view of the fish detecting fishing rod with self-contained power source and alarm and with a ground anchoring spike.

A second embodiment is shown in FIG. 4. In this embodiment, the fishing rod is identical to the one shown in FIG. 1. Although the upper portion of the rod holder is the same, the lower portion is modified to house the alarm 30 and a power source, such as conventional batteries 44. In addition, spike 45 is provided at the base of holder 28 for anchoring the holder to the ground. Thus, in use, the fisherman merely drives the spike 45 into the ground and then proceeds to use the fishing rod and holder 28 as described above. As shown in FIG. 4, when fishing in this position, the tip of fishing rod 11 normally angles upwardly. Accordingly, mercury switch 20 is mounted in the inverted position so the mercury is normally in the top of the vile. Upon a fish strike, the tip of the rod will be pulled downwardly beyond a generally horizontal position to thereby actuate mercury switch 20.

Thus, in this embodiment, a fisherman can leave one or more fishing rods unattended and can be assured of being quickly notified as to any action taking place with respect to any of his fishing rods.

While preferred embodiments of the present invention have been described and illustrated, it will be obvious to those skilled in the art that various modifications and changes can be made without departing from the spirit of the present invention. Accordingly, the scope of the present invention is deemed to be limited only by the appended claims.

The embodiments of the invention in which an exclusive property or privilege is claimed are defined as follows:

1. A fish detecting fishing rod and holder comprising:
 a fishing rod;
 a mercury switch mounted near the tip of said rod;
 a handle on the lower end of said rod having electrical plug receiving means at the base thereof;
 a rod holder sized to receive and hold said rod handle and having electrical plug means to plug into said handle plug receiving means;
 an electrical alarm;
 a power source for said alarm;
 electrical connecting means connecting said mercury switch and said handle plug receiving means; and
 electrical connecting means connecting said holder plug means, said alarm and said power source.

2. The fish detecting fishing rod and holder according to claim 1 further comprising a manual on-off switch for said alarm.

3. The fish detecting fishing rod and holder according to claim 2 wherein said electrical connecting means connecting said mercury switch and said handle plug receiving means comprises electrical wires leading from said mercury switch internally of said rod and said handle to said handle plug receiving means.

4. The fish detecting fishing rod according to claim 1 wherein said power source and said alarm are contained within said rod holder and which further comprises spike means at the base of said holder for anchoring said holder to the ground.

* * * * *